United States Patent [19]

DeDoncker et al.

[11] Patent Number: 5,027,264
[45] Date of Patent: Jun. 25, 1991

[54] POWER CONVERSION APPARATUS FOR DC/DC CONVERSION USING DUAL ACTIVE BRIDGES

[75] Inventors: Rik W. DeDoncker, Niskayuna, N.Y.; Mustansir H. Kheraluwala; Deepakraj M. Divan, both of Madison, Wis.

[73] Assignee: Wisconsin Alumni Research Foundation, Madison, Wis.

[21] Appl. No.: 415,078

[22] Filed: Sep. 29, 1989

[51] Int. Cl.[5] .................................... H02M 3/335
[52] U.S. Cl. ...................................... 363/16; 363/27; 363/129; 363/17
[58] Field of Search .................. 363/15, 16, 17, 27, 363/28, 127, 128, 129

[56] References Cited

U.S. PATENT DOCUMENTS

| | | | |
|---|---|---|---|
| 3,487,289 | 12/1969 | McMurray | 363/58 |
| 3,517,300 | 6/1970 | McMurray | |
| 4,079,305 | 3/1978 | Peterson et al. | 363/27 |
| 4,399,499 | 8/1983 | Butcher et al. | 363/127 |
| 4,415,959 | 11/1983 | Vinciarelli | 363/21 |
| 4,462,070 | 7/1984 | Iida | 363/28 |
| 4,672,528 | 6/1987 | Park et al. | 363/17 |
| 4,864,483 | 9/1989 | Divan | 363/37 |

FOREIGN PATENT DOCUMENTS

| | | | |
|---|---|---|---|
| 0112878 | 9/1981 | Japan | 363/17 |
| 0752743 | 7/1980 | U.S.S.R. | 363/27 |

OTHER PUBLICATIONS

F. C. Schwarz, et al., "A Controllable 45-kW Current Source for DC Machines," IEEE Transactions IA, vol. IA-15, No. 4, Jul./Aug. 1979, pp. 437–444.
D. M. Divan, et al., "Pseudo-Resonant Full Bridge DC/DC Converter," IEEE-PESC 1988 Conf. Rec., pp. 284–289.
A. S. Kislovski, "Half-Bridge Power-Processing Cell Utilizing A Linear Variable Inductor and Thyristor-Dual Switches," IEEE-PESC 1988 Conf. Rec., pp. 284–289.
K. H. Liu, et al., "Zero-Voltage Switching Techniques in DC/DC Converter Circuits," IEEE-PESC Conf. Rec., pp. 58–70, Jun. 1986.
W. A. Tabisz, et al., "Zero-Voltage-Switching Multi--Resonant Technique-A Novel Approach to Improve Performance of High Frequency Quasi-Resonant Converters," IEE-PESC 1988 Conf. Rec., pp. 9–17.
D. M. Divan, et al., "Zero Switching Loss Inverters For High Power Applications," IEEE-IAS Conf. Rec., 1987, pp. 627–634.
D. M. Divan, "Diodes as Pseudo Active Elements in High Frequency DC/DC Converters," IEEE-PESC 1988 Conf. Rec., pp. 1024–1030.
D. M. Divan, et al., "Design Methodologies for Soft Switches Inverters," Conf. Rec.
R. L. Steigerwald, "High-Frequency Resonant Transistor DC-DC Converters," IEEE Transactions on Industrial Electronics, vol. IE-31, No. 2, May 1984, pp. 181–191.
R. E. Fuja, et al., "Three-Phase Energy Transfer Circuit with Superconducting Energy Storage Coils," IEE Transactions on Industry Applications, vol. 1A-16, No. 3, May/Jun. 1980, pp. 438–444.
M. Ehsani, et al., "A One-Phase Dual Converter for Two-Quadrant Power Control of Superconducting Magnets," IEEE Transactions on Magnetics, vol. MAG-21, No. 2, Mar. 1985, pp. 1115–1118.

*Primary Examiner*—Peter S. Wong
*Attorney, Agent, or Firm*—Foley & Lardner

[57] ABSTRACT

A DC/DC power converter suitable for high power applications has an input converter which converts the DC input voltage to an AC voltage and supplies this voltage to a transformer. The output of the transformer is provided to an output converter which converts the AC to a DC output voltage at a controlled level to a load. Both the input and output converters are composed of active gate controlled switching devices and are switched in a soft-switched manner to minimize switching losses and increase switching frequency. The converters can be implemented in single phase or polyphase configurations and can be controlled to closely maintain the output voltage provided to the load at a desired level.

11 Claims, 8 Drawing Sheets

POWER CONVERSION APPARATUS FOR DC/DC CONVERSION USING DUAL ACTIVE BRIDGES

TECHNICAL FIELD

This invention pertains generally to the field of electrical power conversion systems and particularly to systems providing high power density DC to DC conversion.

BACKGROUND OF THE INVENTION

The area of high power density DC/DC converters has been an important research topic, especially for switched mode power supply applications rated at up to 500 watts. The needs of the next generation of aerospace applications require extremely high power densities at power levels in the multi-kilowatt to megawatt range. The implications of realizing high power density and low weight systems at these power levels have rarely been addressed.

Recognizing that higher switching frequencies are the key to reducing the size of the transformer and filter elements, it is apparent that some form of soft switching converter with zero switching loss is required, if system efficiencies and heat sink size are to be maintained at a reasonable level. By far the most attractive circuit so far has been the series resonant converter (SRC). See F. C. Schwarz, J. B. Klaassens, "A Controllable 45-kw Current Source for DC Machines", IEEE Transactions IA, Vol. IA-15, No.4, July/August 1979, pp. 437-444. Using thyristors with a single LC circuit for device commutation and energy transfer, the topology is extremely simple in realization and offers the possiblity of power densities in the 0.9-1.0 Kg/KW range at power levels up to 100 KW.

The following problems can be identified with the SRC. Thyristor commutation requirements demand higher current ratings from the devices and higher VA ratings from the LC components. Thyristor recovery times significantly slow down the maximum switching frequencies attainable. Snubber inductors and RC networks are needed to effect current transfer without encountering a diode recovery problem. Capacitive input and output filters have to handle ripple currents at least as large as the load current. Although switching frequencies in the 10 KHz range yield dramatic reduction in converter size when compared to conventional hard switching circuits, it is clear that systems operating at similar frequencies and with lower component ratings are potentially capable of even higher power densities.

Soft switched converters are characterized by intrinsic modes of operation which allow an automatic and lossless resetting of the snubber elements through an appropriate recirculation of trapped energy. The capability to eliminate losses associated with the snubber permit the use of oversized snubbers resulting in dramatically lower device switching losses, even at substantially higher frequencies. Examples of soft switched DC/DC converters are the parallel output SRC operated above resonance, R. L. Steigerwald, "High-Frequency Resonant Transistor DC/DC Converters", IEEE Transactions on Industrial Electronics, Vol. IE-31, No. 2, May 1984, pp. 181-191, the resonant pole, the pseudo-resonant coverter, D. M. Divan, 0. Patterson, "A Pseudo Resonant Full Bridge DC/DC Converter", IEEE-PESC 1987, Conf. Rec. pp. 424-430., A. S. Kislovski, "Half Bridge Power Processing Cell Utilizing a Linear Variable Inductor and Thyristor Dual Switches", IEEE-PESC 1988 Conf Rec , pp. 284-289, and all quasi-resonant converters, K. H. Liu & F. C. Lee, "Zero-Voltage Switching Technique in DC/DC Converters", IEEE-PESC Conf. Rec. pp. 58-70, June 1986, W. A. Tabisz and F. C. Lee, "Zero Voltage Switching Multi-Resonant Technique - A Novel Approach to Improve Performance of High Frequency Quasi-Resonant Converters," IEEE-PESC 1988 Conf. Rec., pp. 9-17, Vinciarelli, U.S. Pat. No. 4,415,959. For multi-quadrant operation and for DC/AC inverter applications, typical examples of soft-switched topologies are the resonant DC link inverter and the quasi-resonant current mode or resonant pole inverter as discussed in the Tabisz and Lee article, supra.

The use of a MOSFET as a synchronous rectifier in low voltage, low power applications has been proposed. In this mode, MOSFET operation is synchronized with its anti-parallel diode to obtain a low forward voltage drop. See B. J. Baliga, "Modern Power Devices, " John Wiley, 1987; Fisher, Korman and Franz, "Performance of Low Loss Synchronous Rectifiers in a Series Parallel Resonant DC-DC Converter," APEC 89 Conf. Record.

The preferred DC/DC converter topology for high power applications has been the full bridge circuit operated at constant frequency under a pulse width control strategy. The topology features minimal voltage and current stresses in the devices, minimum VA rating of the high frequency transformer, as well as low ripple current levels in the output filter capacitor. The power density levels that can be reached are limited by peak and average device switching losses, transformer leakage inductances and output rectifier reverse recovery. The factors above constrain the maximum frequency attainable, and thus the smallest size possible, given the state of the art in component technology. Most of the soft switching converters reported in the literature attempt to tackle one or more of the problems listed above, typically at the expense of substantially higher component stresses. For high power operation, that is unacceptable. Soft switching variations of the full bridge converter are thus the most favoured topologies.

A pseudo-resonant DC/DC converter is described in the Divan and Patterson article, supra. It uses capacitive snubbers and can be designed with device stresses approaching that of the conventional full bridge. However, the circuit uses the transformer as a voltage transfer element and the interactions of its leakage inductance ($L_1$) and the output rectifier are unresolved. The maximum switching frequency limit is reached when the energy lost due to $L_1$ and the peak diode reverse recovery current become unacceptable.

It has been proposed in D. M. Divan, "Diodes as Pseudo-Active Elements in High Frequency DC/DC Converters," IEEE Trans. Power Electronics, Vol. 4, No. 1, Jan. 1989, that the diode recovery process in such circuits is akin to the existence of an active device in anti-parallel with it.

SUMMARY OF THE INVENTION

The power conversion apparatus of the present invention provides soft-switching DC/DC conversion suitable for high power applications. The soft switching makes possible a reduction in device switching losses and an increase in switching frequency.

The conversion apparatus of the invention can be implemented in a single phase system having dual active bridges with the power transferred between them through a single phase transformer. A three-phase dual bridge converter in accordance with the invention consists of two three phase inverter stages operating in a high frequency six-step mode. In contrast to existing single phase AC link DC/DC converters, low RMS current ratings are obtained for both the input and the output filter capacitors. This advantage is in addition to the smaller filter element values which can be utilized due to the higher frequency content of the input and output waveforms. The three phase system has the further advantage that a three phase symmetrical transformer allows better utilization of the available apparent power of the transformer (as a consequence of the controlled output inverter), significantly increasing the power density obtainable.

Further objects, features, and advantages of the invention will be apparent from the following detailed description when taken in conjunction with the accompanying drawings.

DETAILED DESCRIPTION OF THE INVENTION

The conversion apparatus of the present invention converts DC power on one side of the converter to controlled DC power on the other side of the converter at a desired voltage and/or current level. The input DC voltage is provided to a bridge circuit, formed of active switching elements, which inverts the DC voltage to an AC voltage and provides the AC voltage to a transformer. The AC voltage output from the transformer is provided to a bridge circuit, also composed of active switching elements, which delivers a rectified voltage to a load. The converter can be operated with a relatively simple control strategy in which the input and output bridges generate square waves with resonant transitions, or quasi-square waves, at the primary and secondary of the transformer which are phase shifted with respect to each other. Regions of operation can be identified which permit soft-switching of all devices in both bridges.

Figure 1:
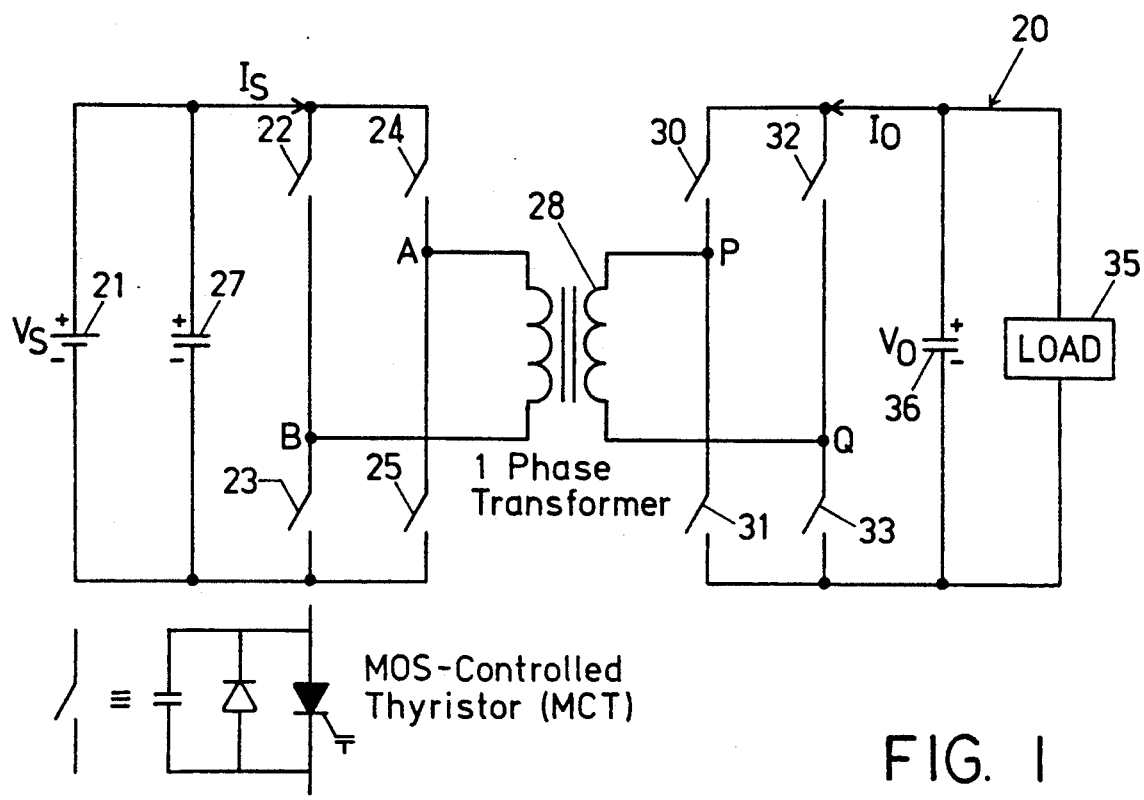
FIG. 1 schematic circuit diagram of a single phase dual bridge DC/DC converter in accordance with the invention.

A single phase dual bridge DC/DC converter in accordance with the present invention is shown at generally at 20 in FIG. 1. The converter receives a DC voltage from a voltage source 21, such as a battery or a power line the AC power from which has been rectified and filtered, and the DC source voltage $V_s$ is provided to an input bridge composed of four switching devices 22-25 connected in a full bridge configuration. A capacitor 27 is connected across the DC input line to smooth any transients in the DC input voltage. The output of the bridge, taken across the two points A and B, is provided to the primary of a single phase transformer 28. The secondary of the transformer 28, delivering an AC output voltage across the points P and Q, is provided to an output bridge composed of switching devices 30-33 connected in a full bridge configuration. The DC output voltage from the output bridge is provided to a load 35, with a capacitor 36 being connected across the output lines, leading to the load to smooth the output voltage from the output bridge.

The switching devices 22-25 and 30-33 can be a variety of conventionally utilized switching elements with gate controlled current turn off capability. An example of a new switching component which also can be used for high power applications is an MOS-Controlled Thyristor (MCT) with anti-parallel diode and snubbing capacitor connected across the terminals of the thyristor.

Figure 2:
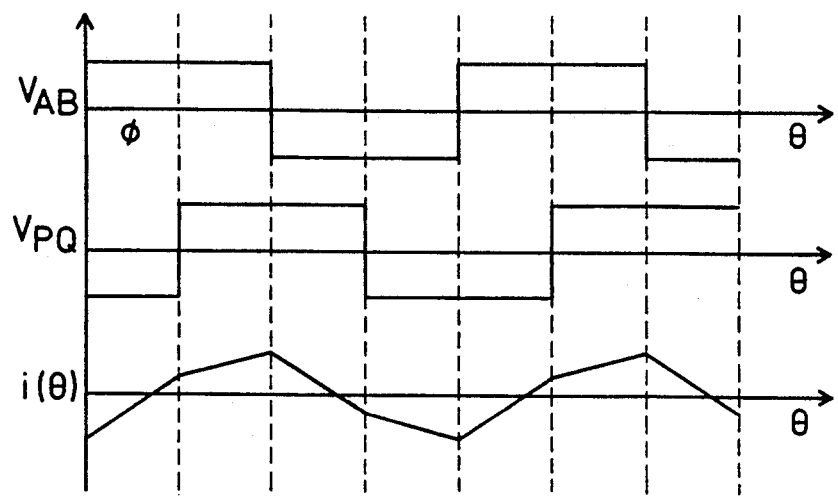
FIG. 2 of voltage and current waveforms for the convert of FIG. 1.

The switching of the switching devices in the input and output bridges is controlled to generate quasi-square waves which are phase shifted with respect to each other, as illustrated by the waveforms of FIG. 2, showing the voltages across the points A-B and P-Q of FIG. 1, and the waveform of the current in the primary of the transformer. These waveforms assume that the resonant transistion duration is substantially less than the period of the quasi-square wave.

Figure 3:
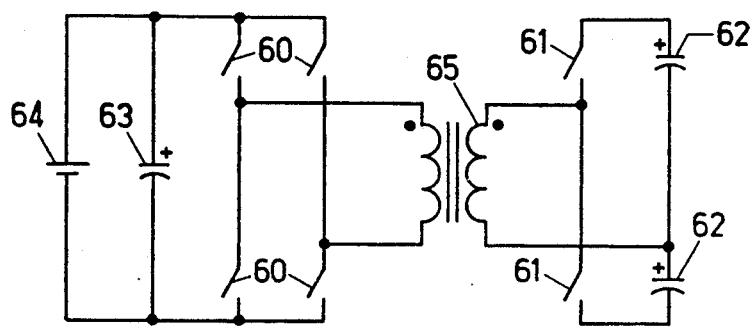
FIG. 3 is a circuit schematic of a single phase converter a half-bridge output.
Figure 3:
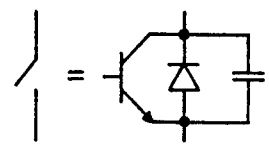
Figure 4:
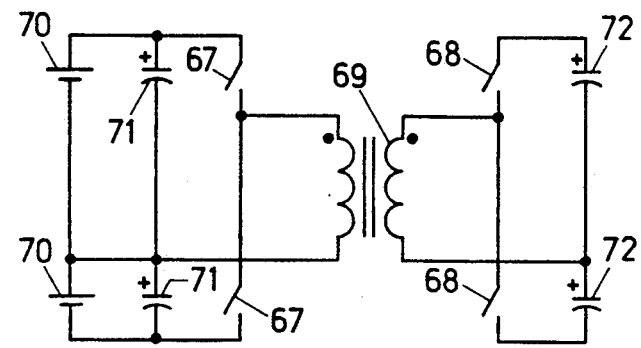
FIG. 4 schematic of a single phase converter having a half-bridge input and a half-bridge output.
Figure 5:
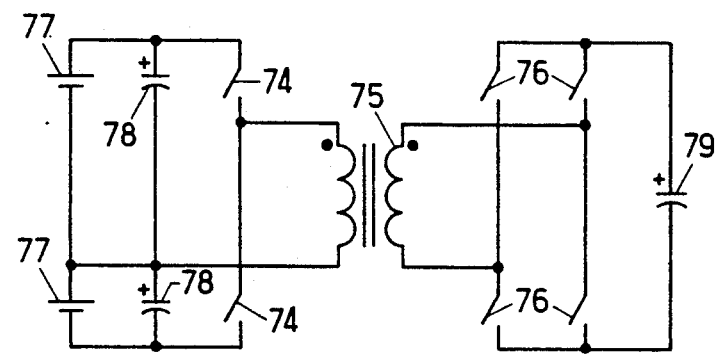
FIG. 5 circuit schematic of a single phase converter having a half-bridge input and a full bridge output.

Simplified schematic views of alternative single phase implementations of the conversion apparatus shown in FIG. 3 through 5. FIG. 3 shows a system having a full bridge input converter formed of switching devices 60 and a half bridge converter formed of two switching devices 61. The output capacitor of FIG. 1 is split into two output capacitors 62, with one terminal of the secondary of the transformer 65 connected between the capacitor 62. The load (not shown) may be connected across one or both of the capacitors. Otherwise the circuit functions in the same manner as the circuit of FIG. 1 with a single input capacitor 63 and voltage source 64. FIG. 4 shows a system in which the input and output converters are both half bridges formed, respectively, of two switching devices 67 and 68, connected by a transformer 69. One primary terminal of the transformer is connected between dual voltage sources 70 and capacitors 71, and one terminal of the secondary is connected between dual capacitors 72, with the load being connected around the capacitors 72. The circuit shown in FIG. 5 has a half bridge input converter formed of two switching devices 74, a transformer 75, a full bridge output converter formed of switching devices 76, dual input voltage sources 77 and capacitors 78, and a single output capacitor 79 around which may be connected the load (not shown). Other similar connections include a full of half-bridge circuit on the input, and a push-pull arrangement with a center tapped transformer secondary on the output.

Figure 6:
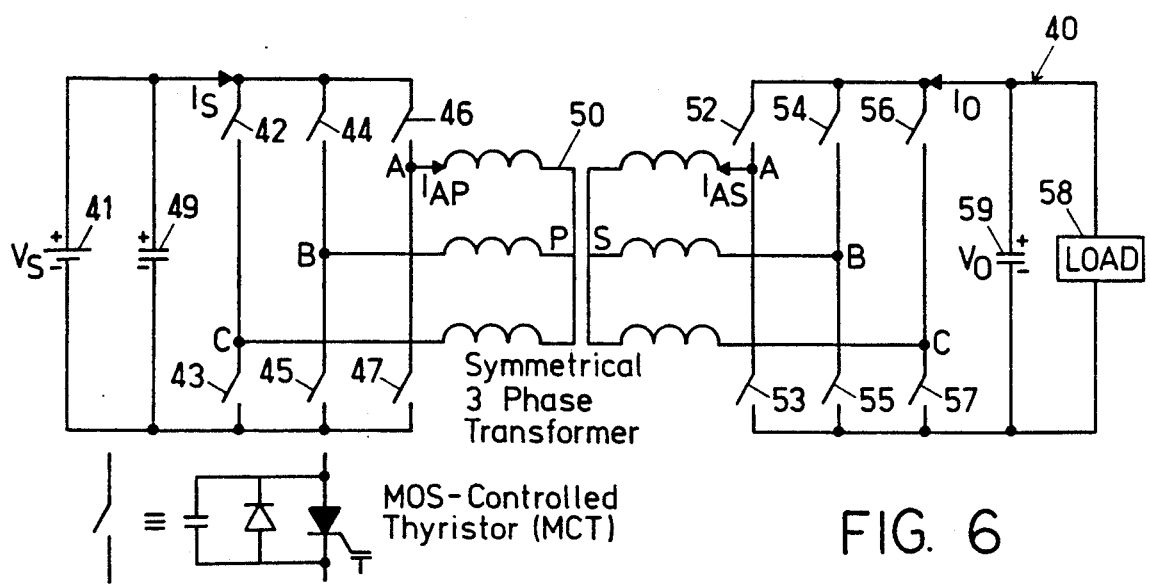
FIG. 6 is schematic of a three phase DC/DC converter in with the invention.

A polyphase conversion apparatus in accordance with the invention is shown generally in schematic form at 40 in FIG. 6. The apparatus 40 receives a DC voltage $V_s$ from a DC voltage source 41 and provides it to a three phase input bridge composed of controlled switching devices 42–47 connected in a full bridge configuration to deliver a three phase output signal across three output terminals A, B and C. A capacitor 49 is connected across the DC input lines to filter out transients. The output from the input bridge converter is provided to the primary of a three phase symmetrical transformer 50. The output from the secondary for this transformer is provided to an output bridge having terminals A, B and C which is composed of controlled switching devices 52–57. These devices rectify the AC voltage received from the three phase transformer to provide a single phase output voltage which is provided to a load 58, with the voltage being filtered by a capacitor 59. Again, the switching devices may be any conventionally utilized controlled switching devices such as MCT devices, with anti-parallel diode bipolar transistors, insulated gate transistors, MOSFETs, and snubber capacitor provided for high power applications with soft switching.

Figure 7:
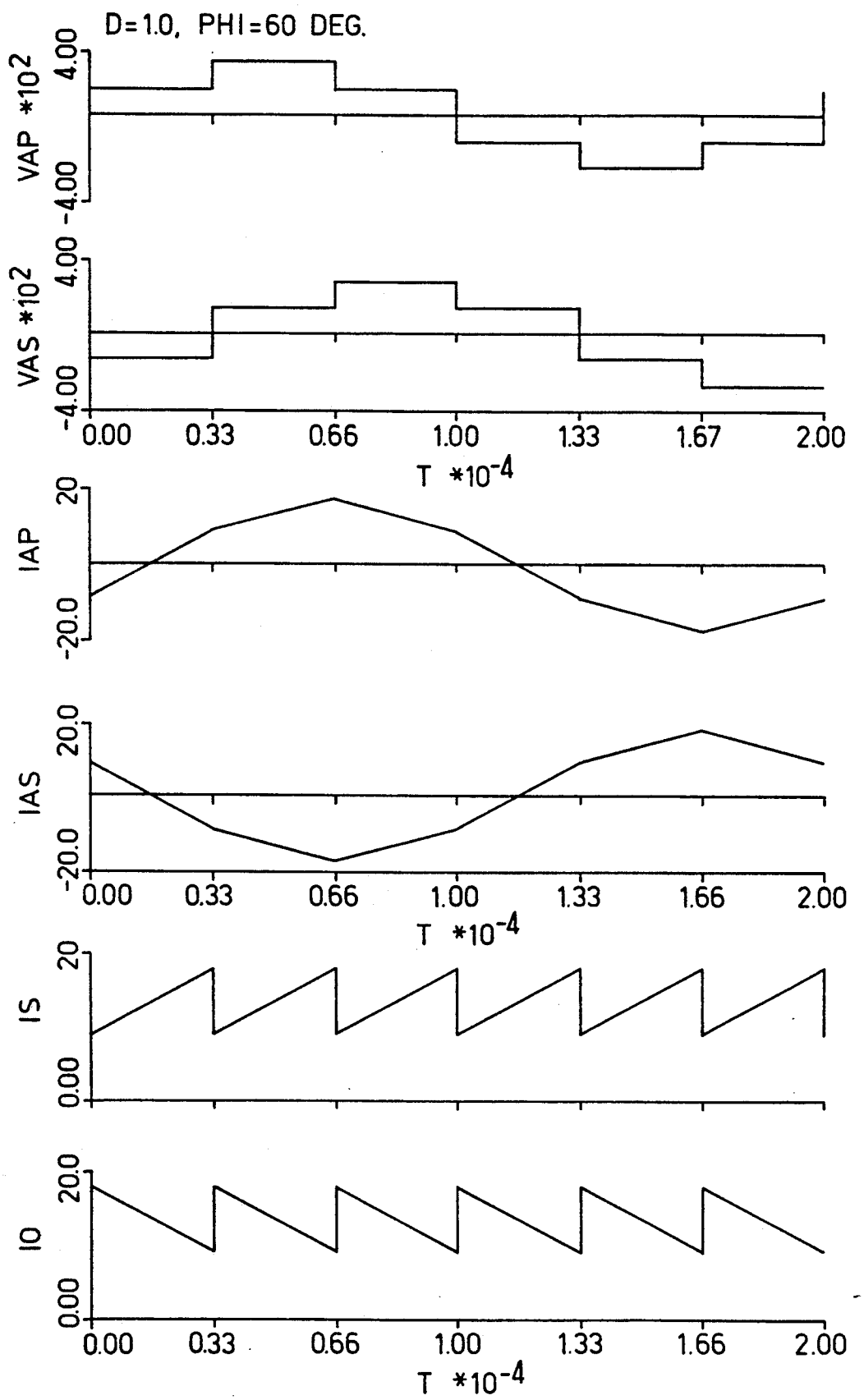
FIG. 7 showing the voltage and current waveforms f of FIG. 6.

It is possible to operate the converter 50 so that both sets of switches in both the input and output bridges are soft-switched. As in the case of the single phase dual bridge converter 20, both bridges generate quasi-square waves at the transformer primary and secondary which are phase shifted from each other, as illustrated in FIG. 7. It should be noted that the soft-switching transition is actually resonant in nature but is assumed to be almost instantaneous for purposes of deriving the first-order operating characteristics. The three phase dual bridge converter 40 has substantially lower filter ratings as compared to its single phase counterpart 20, and consequently has the potential of realizing the highest power density.

The converters 20 and 40 exhibit desireable properties with respect to parasitics such as device storage time, transformer leakage inductance and diode reverse recovery. Transformers which use the leakage impedance as an energy transfer element have the potential of reaching higher power densities. While this technique as been extensively used at lower power levels, it has been felt that the high VA rating of the composite transformer was an unacceptable penalty at higher power levels. It can be shown that the resulting increase in switching frequency which is possible can more than compensate for the increased VA rating, allowing a substantial reduction in the overall size of the converter. The use of dual bridges also yields unexpected gains in power density, and permits bidirectional power flow.

In order to derive the operating characteristics of the DC/DC converters, it is assumed that the transfer of current from device to diode on turn-off is instantaneous. The actual switching locus depends on the value of snubber capacitance, C, used and the current level. For a typical device such as a BJT with a current fall time, $t_f$, and a turn-off current of $I_p$, the device energy loss per switching cycle can be found approximately to be $$E_{sw} = \frac{I_p^2 t_f^2}{24C}$$

As there are no turn-on or snubber dump losses, C can be made fairly small while retaining a fast switching characteristic and low device losses, simultaneously. This justifies the assumption of a fast, almost instantaneous switching transition for analysis over a full cycle.

Figure 8:
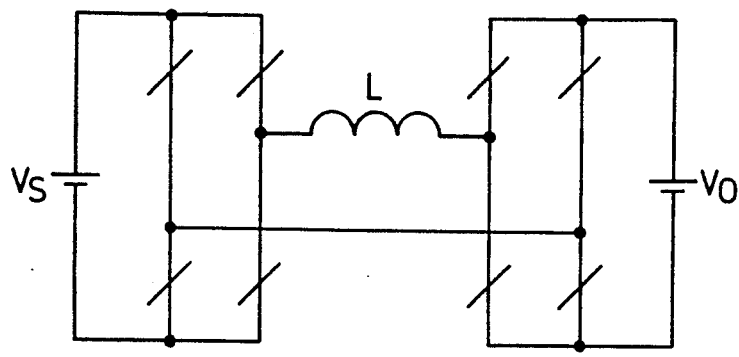
FIG. 8 is an equivalent circuit for the single phase dual bridge/DC converter.
Figure 9:
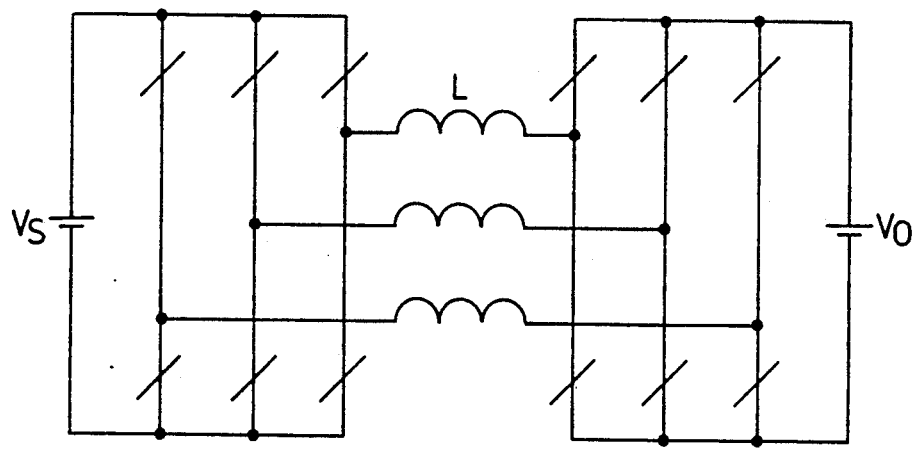
FIG. 9 is an equivalent circuit for the three phase dual bridge AC/DC converter.

The equivalent circuits for the single phase and three phase converters are shown in FIGS. 8 and 9, respectively. Replacing the transformer with an equivalent inductance, L, simplifies circuit analysis.

The converter has two modes of operation over a half cycle. In the steady state, the two bridges are presumed to operate with phase shift $\phi$ (in radians at the fundamental frequency). The current $i(\theta)$ is given by the following equations for modes 1 and 2, respectively.

$$i(\theta) = \left(\frac{V_s + V_o}{\omega L}\right)\theta + i(o) \qquad \text{[Mode 1]}$$

$$i(\theta) = \left(\frac{V_s - V_o}{\omega L}\right)(\theta - \phi) + i(\phi) \qquad \text{[Mode 2]}$$

$$\theta = \omega t$$

The boundary conditions dictate that $i(0) = -i(\pi)$ at the end of Mode 2. Solving for $i(\theta)$, the output power $P_0$, is:

$$P_o = \frac{V_s^2}{\omega L} d\phi \left[1 \frac{\phi}{\pi}\right]$$

where d is the ratio of output voltage to input voltage referred to the primary side.

The constraints which define soft-switching boundaries can be specified for the input and output bridges to be $i(0) \leq 0$ and $i(\phi) \geq 0$, respectively. These contraints enclose the desired operating region for the converter. Exceeding the first constraint results in natural commutation of the input bridge devices and gives snubber dump. For the output converter, the constraint equation corresponds to diode bridge operation.

Figure 10:
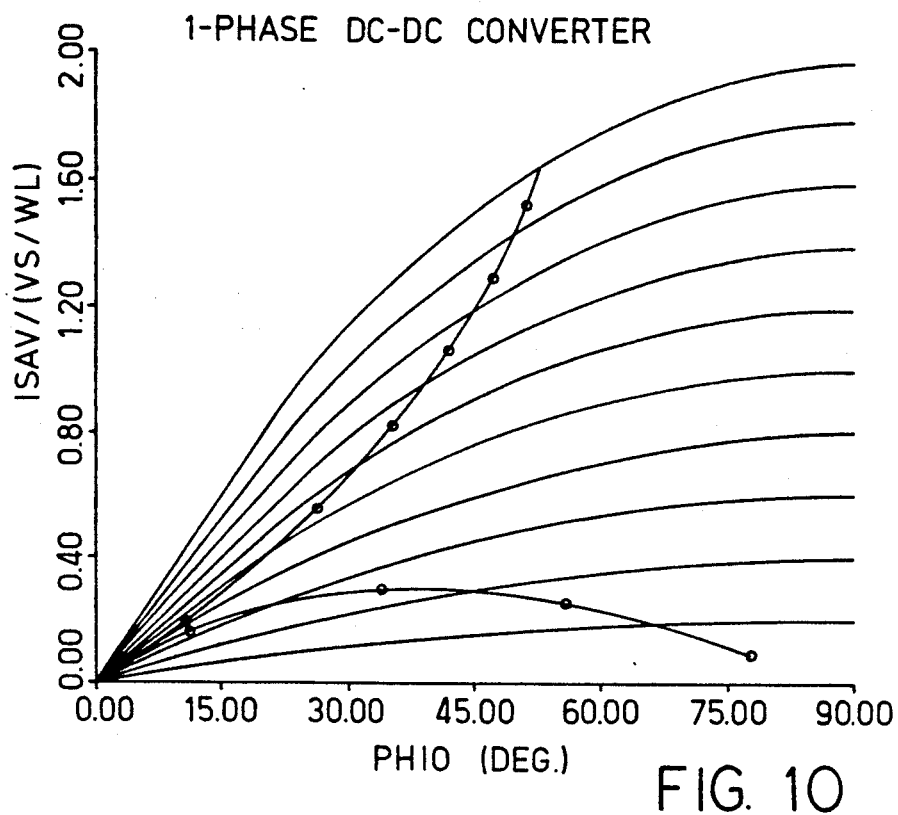
FIG. 10 a graphs showing variation of output power versus phase for various values of output to source voltage ratio d for the single phase DC/DC converter.
Figure 11:
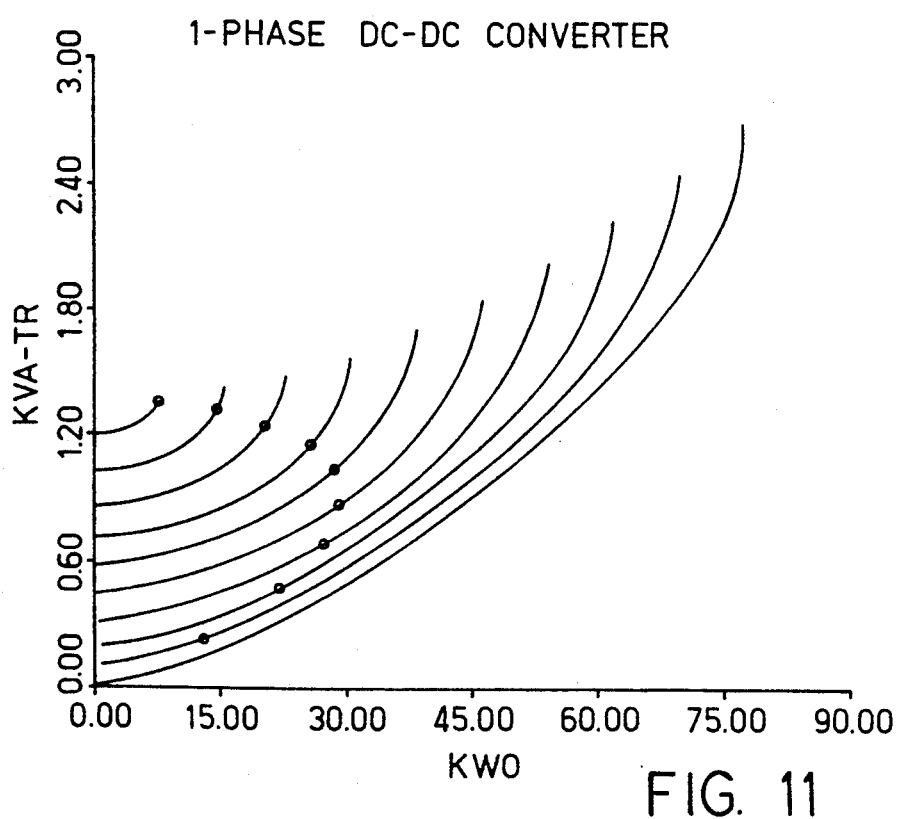
FIG. 11 a plots of KVA versus output power for various values of output voltage to source voltage ratio d for the single phase DC/DC converter.

FIG. 10 shows the variation of normalized output power $P_o$ as a function of $\phi$ for different values of the output voltage to source voltage ratio d. The upper boundary corresponds to the input converter, while the lower curve represents diode operation. For d=1 (d=$V_o/V_s$) it can be seen that $\phi$ can vary over the entire range of 0 to $\pi/2$ giving control from zero to full power. FIG. 11 plots the transformer KVA against the output power for various values of d. The boundary corresponds to an output diode bridge.

Examination of FIG. 11 shows that a transformer KVA of 1.356 pu is required with output diodes if d is to be varied over the range 0 to 1. With dual bridges, for the same transformer KVA, it is now possible to transfer $P_0=0.59$ pu, as against a previous maximum of 0.3 pu. Compared to normal hard switched converters with $KW/(KVA)_T$ ratios approaching unity, this may seem to be very poor transformer utilization. However, if the switching frequency for the proposed converter can be made substantially higher, actual size/weight will be much lower. Transformer sizing is examined in greater detail below.

The circuit schematic of the three phase dual bridge soft-switching AC link DC/DC converter is shown in FIG. 6. The converter consists of two three-phase inverter stages, each operating in a six-step mode with controlled phase shift. Using two active bridges not only permits bidirectional power flow, but also allows control at a fixed frequency. The AC link transformer is Y-Y connected and is three phase symmetric with the leakage inductances used as energy transfer elements.

Figure 12:
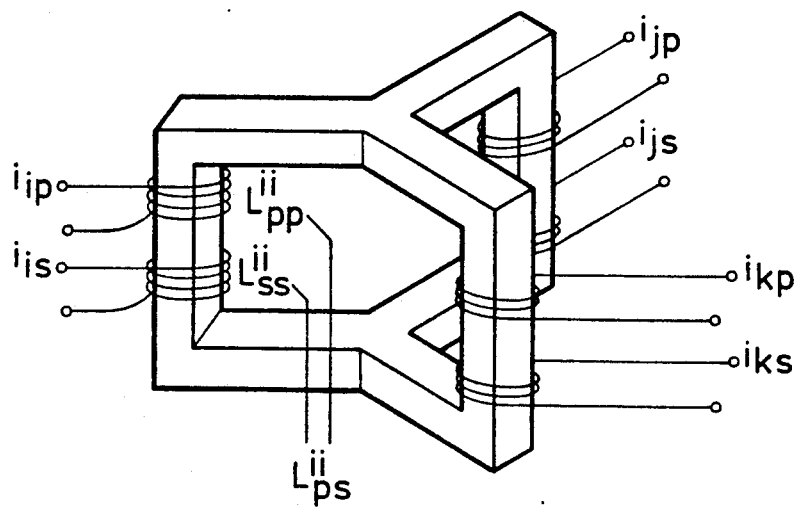
FIG. 12 a schematic illustration of a symmetrical three phase which may be utilized in the three phase DC/DC of the invention.

In the following analysis, is is assumed that the primary and secondary resistances of the transformer can be neglected and the turns ratio is 1:1. FIG. 12 shows a schematic view of a suitable three phase symmetric transformer. Using the relationship $\Sigma i_{ip}=0$ and $\Sigma i_{is}=0$ for Y connected transformers, the transformer equations can be derived to be $$V_{ip}(t) = L_{pl}\frac{di_{ip}}{dt} + (L_{pp}^{ii} + L_{pp}^{ij})\frac{di_{ip}}{dt} + (L_{ps}^{ii} + L_{ps}^{ij})\frac{di_{is}}{dt}$$

and $$V_{is}(t) = L_{sl}\frac{di_{is}}{dt} + (L_{ss}^{ii} + L_{ss}^{ij})\frac{di_{is}}{dt} + (L_{sp}^{ii} + L_{sp}^{ij})\frac{di_{ip}}{dt}$$

where $V_{ip}$ and $V_{is}$ are the primary and secondary voltages for the $i^{th}$ phase, L
  and $L_{sl}$ are the primary and secondary leakage inductances, $L_{pp}$ and $L_{ss}$ are self inductances, and $L_{ps}$, $L_{sp}$ are the mutual inductances between the appropriate phase windings given by the superscript notation used.

Using properties of a symmetric transformer and defining $$L_m = L_{ss}^{ii} + L_{ss}^{ij} = L_{pp}^{ii} + L_{pp}^{ij}$$

one can derive $$\sigma(L_m + L_{sl})\frac{di_{is}}{dt} = V_{is}(t) - \frac{L_m}{L_m + L_{pl}}V_{ip}(t)$$

$$\sigma(L_m + L_{pl})\frac{di_{ip}}{dt} = V_{ip}(t) - \frac{L_m}{L_m + L_{pl}}V_{is}(t)$$

where $\sigma$ is a leakage factor given by $$\sigma = \frac{(L_m + L_{sl})(L_m + L_{pl}) - L_m^2}{(L_m + L_{pl})(L_m + L_{sl})}$$

The value of $\sigma$ is typically a small number around the ratio of the leakage to the magnetizing inductance.

The foregoing are the basic equations which govern the current in the circuit. Further assuming that $L_{sl}=L_{pl} \ll L_m$ (for 1:1 turns ratio), then these equations reduce to $$L_\sigma \frac{di_{is}}{dt} = V_{is}(t) - V_{ip}(t)$$

$$L_\sigma \frac{di_{ip}}{dt} = V_{ip}(t) - V_{is}(t)$$

where $$L_\sigma = \sigma(L_m + L_{sl}) = \sigma(L_m + L_{pl}) \approx (L_{sl} + L_{pl})$$

It can be seen that with the assumptions above, $i_{is}=i_{ip}=i(\theta)$.

In order to calculate the three line currents, the classic six-step line to neutral voltage waveform is assumed for both the primary and secondary windings. The difference between the two voltages is applied across $L_0$. Six modes, corresponding to different driving voltages, can be identified over a 180° conduction cycle. Using the property of a balanced three phase set and $\Sigma i_{ip}=0$, one can obtain full information by calculating two currents over 1/3 of a period. The supply side DC link current can be reconstructed, and is shown in FIG. 7. From this, the average output power is calculated to be $$P_o = \frac{V_s^2}{\omega L_\sigma} d\phi \left[ \frac{2}{3} - \frac{\phi}{2\pi} \right]$$

The above results apply for $0 \leq \phi \leq \pi/3$, the average output power can be found to be $$P_o = \frac{V_s^2}{\omega L_\sigma} d \left( \phi - \frac{\phi^2}{\pi} - \frac{\pi}{18} \right)$$

Important parameters such as the transformer KVA, input and output capacitor ripple current and peak device stresses can also be found by analyzing the current waveform.

Figure 13:
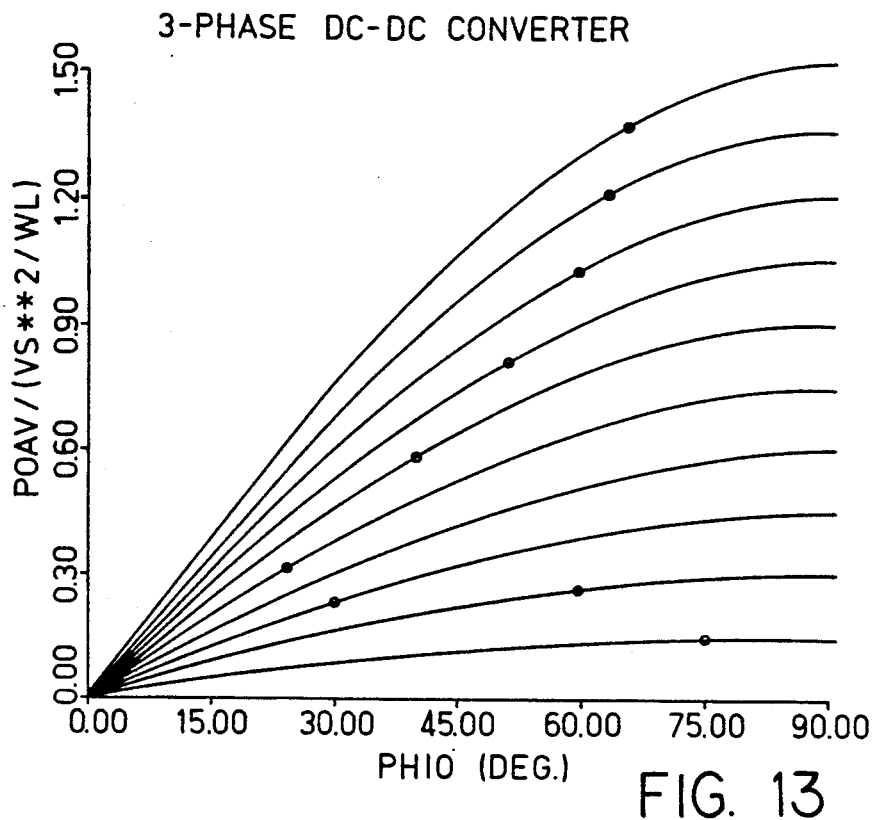
FIG. 13 is a plot of output power versus phase for various values of output voltage to source voltage ratio d for the three phase DC/DC converter.

FIG. 13 is similar to FIG. 10 and shows the variation of $P_0$ as a function of $\phi$ for different values of d. Once again, the curve for d=1 shows a wide range of control, i.e., from zero power for $\phi=0$ to maximum power for $\phi=\pi/2$. The lower boundary corresponds to the soft-switching locus for a diode output bridge. This locus is derived by finding the value of $\phi=\phi_c$ such that $i(\phi_c)=0$. For $0 \leq \phi \leq \pi/3$ this yields the lower boundary $d_1$:

$$d_1 = 1 - \frac{3\phi}{2\pi}$$

The upper boundary governs the transition for the input bridge between natural commutation and soft-switching. This corresponds to the relationship $i(0)=0$, which yields $d_u$:

$$d_u = \frac{1}{1 - \frac{3\phi}{2\pi}}$$

For $\pi/3 \leq \phi \leq 2\pi/3$, the lower and upper boundaries are:

$$d_u = \cfrac{1}{\cfrac{3}{2} - \cfrac{3\phi}{\pi}}$$

Figure 14:
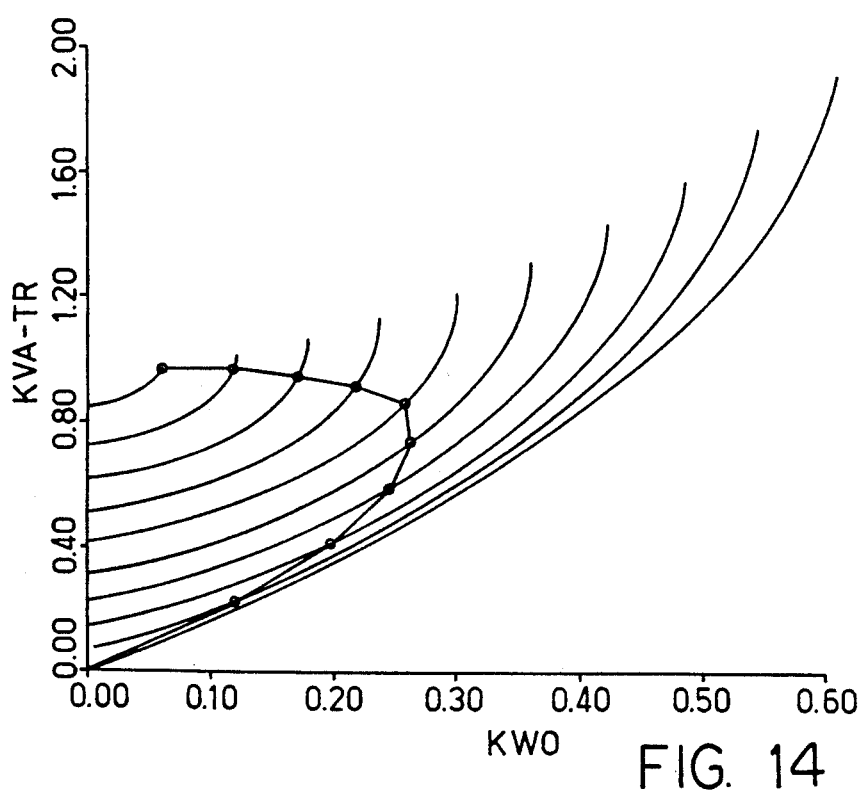
FIG. 14 are plots of KVA versus output power for various values of output voltage to source voltage ratio d for the three phase DC/DC converter.
Figure 15:
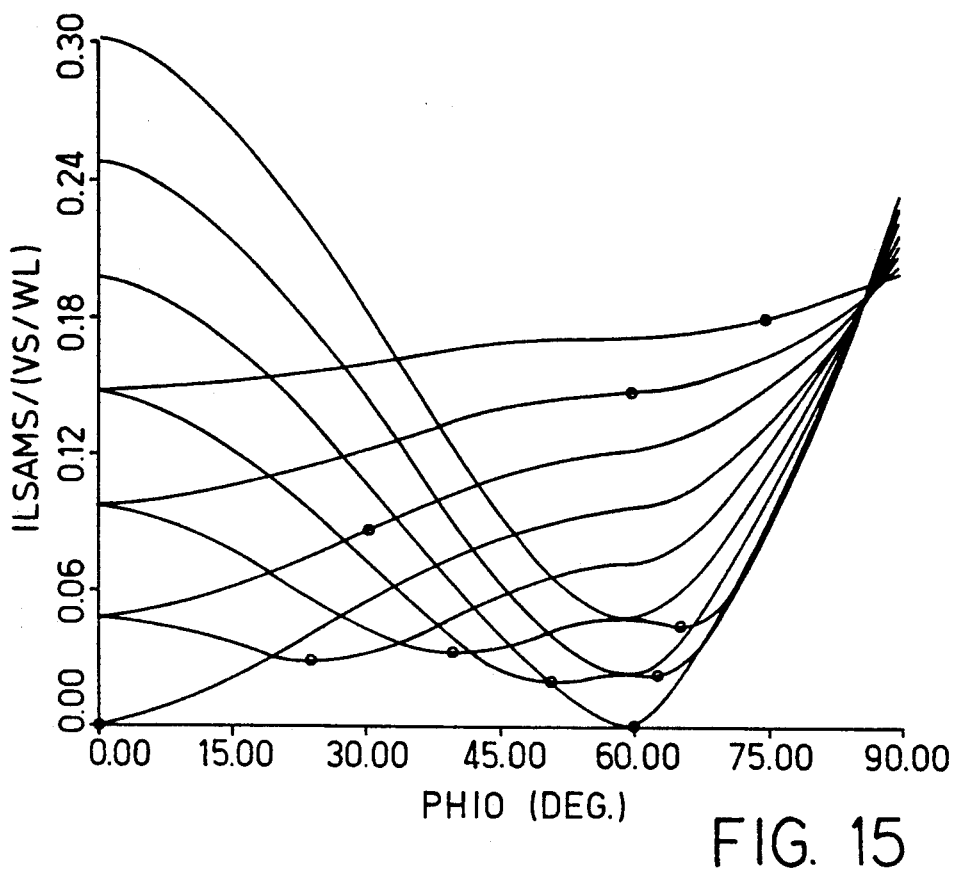
FIG. 15 are plots of RMS current in the input capacitor filter for the three phase DC/DC converter.
Figure 16:
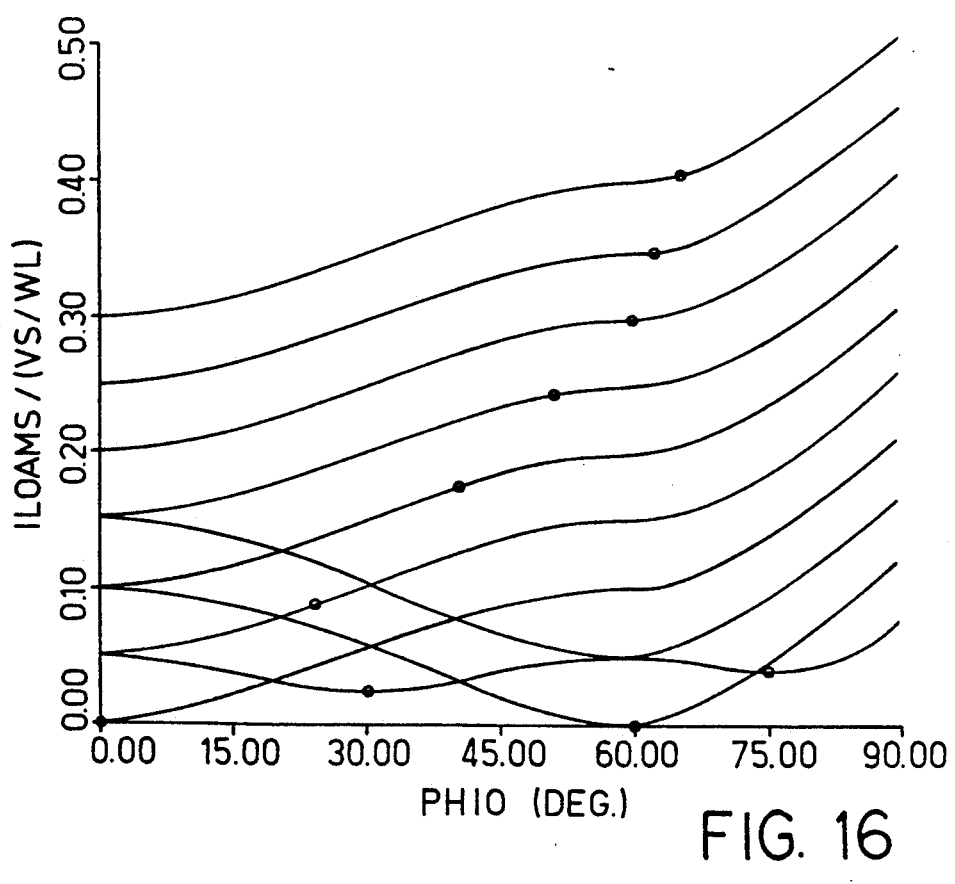
FIG. 16 are plots of RMS current in the output capacitor filter for the three phase DC/DC converter.

FIG. 14 shows the KVA rating of the transformer for $0 \leq d \leq 1$ as a function of the output power. The locus corresponding to output diode bridge operation is also plotted. Once again, it can be seen that maximum output power with the dual bridge is 0.46 pu with a KW/(KVA)$_T$ ratio of 0.48. For the diode bridge, $P_o=0.265$ pu and KW/(KVA)$_T=0.38$, a substantial difference. FIGS. 15 and 16 show the ripple current in the input and output capacitor filters as a function of d and $\phi$. For $d=0.5$ and $\phi=60°$, the output current ripple goes to zero. At the maximum power transfer point of $P_0=0.46$ pu, $\phi=50.1°$ and the output current ripple is 0.095 pu while the input current ripple is 0.0925 pu. For lower values of d, the output current ripple increases. However, under all conditions the ripple is substantially smaller than for the single phase converters. Clearly, given the operating range of the converter, an optimization is possible which yields the smallest *total* filter size.

The analysis of the two dual active bridge converter topologies has yielded interesting and fairly counter-intuitive results in terms of overall system power density. It is not obvious why, given a transformer, one is able to obtain more power with a dual active bridges than with a single active bridge.

It can be shown that the ratio of transformer sizing constants for hard and soft switching is given by $$\frac{S_s}{S_h} = \frac{2 \sin \phi_h}{1 + \tan \cfrac{\phi_h}{2}}$$

where $S_s$ is sizing constant for the soft switching converter and $S_h$ is the sizing constant for hard switching.

Because typical values for $\phi_h$ are in the 2–10° range, it can be seen that significant reduction in transformer size are possible by switching to a scheme where the leakage inductances are the current transfer elements. This comparison is further strengthened when the losses resulting from interaction of diode reverse recovery and leakage inductance are considered for a current source output DC/DC converter.

The converters have been described above in detail including sufficient information for the development of operating characteristics. For purposes of illustrating the invention, only a small fraction of the converter curves are presented. In order to better compare the converters, Table 1 presents the detailed specifications for various components for the converters of the invention. The design is denormalized so as to conform to a 100 KW specification at 500 Volts/200 Amps DC.

Examining peak device stresses, the three phase dual bridge offers the lowest ($V_{cc} \cdot I_c$) stress at (1.265 ·load KW) as opposed to a factor of 3.45 for a diode output bridge converter. The single phase converter is reasonably good at 1.35. Similar conclusions are seen from the transformer (KVA)T ratings. The three phase converter requires a transformer which is 10% smaller than required for the single phase converter. Both dual bridge converters compare reasonably will except for input and output filters. The total capacitive KVA needed for the three phase converter is 40.7 KVA as opposed to 141.6 KVA needed for the single phase converter. The r.m.s. current ratings calculated for capacitors are well within the capability of multilayer ceramic capacitors available commercially, provided, proper packaging is done.

A value of WL has been specified in order to attain the desired specifications. The actual choice of W and L will depend on the core material and detailed transformer design. Limitations on transformer size minimization may be imposed by the weak scaling factors that govern how the leakage inductances reduce with size as operating frequency is increased.

TABLE 1

| | | Converter 20 single phase dual bridge converter | Converter 40 three phase dual bridge converter |
|---|---|---|---|
| 1. | Converter Specs (V$_s$) | 500 V | 500 V |
| a. | Power rating | 100 KW | 100 KW |
| b. | Output voltage (V$_o$) | 500 V (d = 1) | 500 V (d = 1) |
| c. | Output current (I$_o$) | 200 A | 200 A |
| 2. | Device Specs. | | |
| a. | Type of device | Gate turn-off device | Gate turn-off device |
| b. | No of devices | 4 + 4 = 8 | 6 + 6 = 12 |
| c. | Peak voltage | V$_s$ = 500 V | V$_s$ = 500 V |
| d. | Peak current | 270.68 A | 253.45 A |
| e. | (Vpk*Ipk)/KW | 1.35 | 1.265 |
| 3. | Transformer Specs. $\omega$L | 1.475 ohms | 1.15 ohms |
| a. | Max. primary volts | 500 V | 2 V$_s$/3 = 333 V |
| b. | Peak primary current | 270.68 A | 253.45 A |
| c. | Max. sec. volts | 500 V | 2 V$_s$/3 = 333 V |
| d. | Max. sec current | 270.68 A | 253.45 A |
| e. | KVA | 229.83 | 207.83 |
| r. | RMS current | 244.07 A | 162.78 A |
| 4. | Reactive Elements | | |
| a. | Input filter | | |
| | i. Capacitor voltage | 500 V | 500 V |
| | ii. Capacitor rms current | 141.02 A | 40.17 A |
| | iii. Capacitor KVA | 70.51 | 20.1 |
| b. | Output filter | | |
| | i. Capacitor voltage | 500 V | 500 V |
| | ii. Capacitor rms current | 142.37 A | 41.3 A |
| | iii. Capacitor KVA | 71.19 | 20.65 |

The new DC/DC converters of the invention all operate in a soft switched manner making possible a reduction of device switching losses and an increase in switching frequency. Along with soft-switching, all utilize the leakage elements and eliminate problems of interaction between these leakage inductances and diode reverse recovery. The dual bridge topologies are also capable of buck-boost operation and bi-directional power flow.

The current transfer mode of operation makes it easier to parallel multiple modules for extending the power capacity of the system. The use of a three phase AC link system dramatically reduces the capacitor ripple currents, making it possible to use high power density multi-layer ceramic capacitors. The dual bridge converters are also seen to offer an unexpected gain in the power density attainable as a result of the controlled action of the two bridges. As the snubbers used are purely capacitive, these would supplement the internal device capacitance, giving a clean power structure. The total number of system components is also seen to be minimal the input and output filter capacitors, two bridges and one transformer. All device and component parasitics are used favorably.

Both the single and three phase dual bridge converters have favorable characteristics including, small number of components, low device and component stresses, zero (or low) switching losses for all devices, small filter components, high efficiency (no trapped energy), high power density, bidirectional power flow, buck-boost operation possible, low sensitivity to system parasitics, and parallel operation possible as a result of current transfer.

Figure 17:
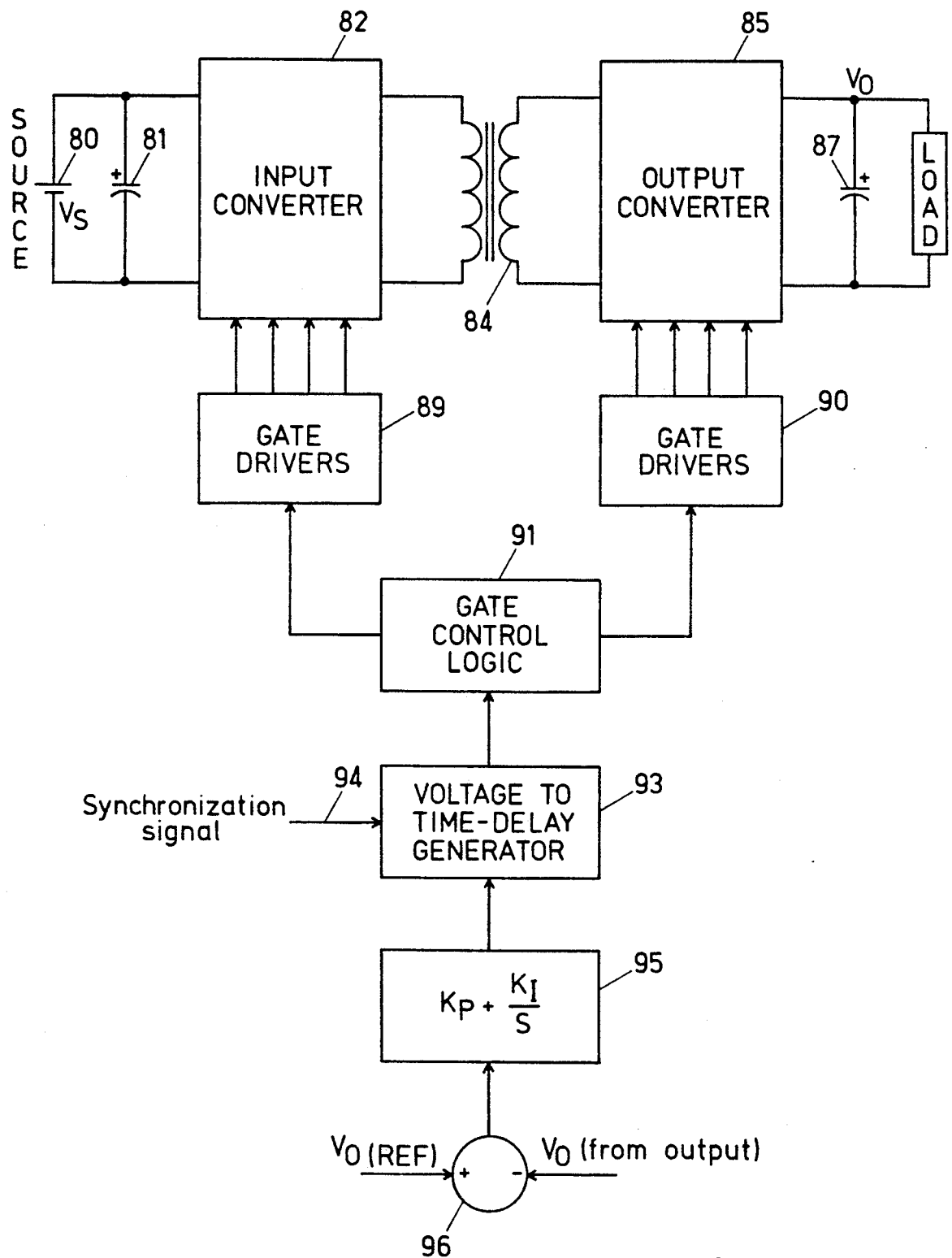
FIG. 17 is a block diagram of a conversion apparatus of the invention having feedback control of output voltage.

A schematic block diagram showing on exemplary controller for the DC/DC converter of the invention is given in FIG. 17. The system includes a DC voltage source 80, a input filtering capacitor 81, an input converter 82, a transformer 84 (single phase or three phase, as appropriate) having its primary connected to the output of the input converter and its secondary connected to the input of an output converter 85, a load 86 connected to receive the output voltage from the output converter and an output smoothing capacitor 87. The input converter 82 and the output converter 85 may be any of the single phase or polyphase converters described above.

The controller for the converter system includes gate drivers 89 for the input converter 82 and gate drivers 90 for the output converter 85, each supplying the firing signals to the gates of the active devices within the input and output converters, respectively. The gate drivers 89 and 90 are in turn controlled by gate control logic 91 of conventional design. A phase delay controller 93 generates the control signal provided to the gate control logic 91 to provide the desired time or phase delay to maintain the output voltage at the desired level. The voltage to time-delay generator 93 receives a time sychronization signal on an input line 94 to provide a time reference and also receives the output of a proportional-integral compensator 95 which operates on the difference signal, received from a summing junction 96, between a desired reference voltage $V_o(REF)$ and the actual output voltage $V_o$ from the output converter 85. Thus, the system of FIG. 17 will seek to control the output voltage $V_\phi$ the reference voltage level despite changes in power drawn by the load, and the voltage across the load can be adjusted in a selected manner by varying the reference voltage.

It is understood that the invention is not confined to the particular embodiments set forth herein as illustrative, but embraces all such forms thereof as come within the scope of the following claims.

What is claimed is:

1. DC/DC static power conversion apparatus comprising:
   (a) an input converter adapted to receive a DC source voltage from a DC source and containing a plurality of active gate controlled gate turn-off switching elements connected in a bridge configuration to allow the DC input voltage to be converted to an AC output voltage at the output of the converter;
   (b) a transformer with primary and secondary windings and leakage inductance, the primary connected to receive the output of the input converter;
   (c) an output converter connected to the secondary of the transformer for converting the AC voltage at the secondary of the transformer to a DC output voltage at the output of the converter, the output converter containing a plurality of gate controlled active gate turn-off switching elements arranged in a bridge configuration to allow the AC input to be converted to the DC output voltage from the converter; and
   (d) control means connected to the gates of the input converter switching elements and the gates of the output converter switching elements for controlling the input converter switching elements in a soft-switched manner to convert the DC source voltage to an AC output voltage at a selected frequency at the output of the input converter, and for controlling the switching of the output converter switching elements in a soft-switched manner to convert the AC input voltage at the selected frequency at the input of the output converter to a DC voltage at the output of the output converter, the switching of the input converter and output converter switching elements being controlled to provide a phase difference between the voltages at the primary and secondary of the transformer which yields a desired output voltage and power level from the output converter.

2. The apparatus of claim 1 wherein at least one of the input or output converters comprises plural gate controlled switching elements connected in a single phase bridge configuration.

3. The apparatus of claim 1 wherein the switching elements in at least one of the input or output converters is connected in a polyphase bridge configuration.

4. The apparatus of claim 1 wherein the switching elements in the input converter are connected in a bridge configuration to provide a three phase output, wherein the transformer is a three phase transformer, and wherein the output converter has the switching elements thereof connected in a bridge configuration to receive a three phase input from the transformer and provide a DC output voltage.

5. The apparatus of claim 4 wherein the transformer is a three phase symmetrical transformer with the leakage inductances of the transformer used as the energy transfer element.

6. The apparatus of claim 5 wherein the transformer is Y—Y connected.

7. The apparatus of claim 4 wherein each of the three phase input and output converters is controlled by the control means to operate in a six-step mode with controlled phase shift.

8. The apparatus of claim 1 wherein the control means compares the output voltage from the output converter with a reference voltage and controls the switching of the switching elements in the input and output converters to adjust the phase difference between the voltages at the primary and secondary of the transformer to maintain the output voltage at a desired level.

9. The apparatus of claim 8 wherein the control means provides proportional-integral compensation of a difference signal between the reference output voltage and the actual output voltage of the output converter.

10. The apparatus of claim 1 wherein each of the switching elements includes a gate controlled active device and an anti-parallel diode and snubbing capacitor connected in parallel therewith.

11. The apparatus of claim 1 including an input smoothing capacitor connected across the input to the input converter and an output smoothing capacitor connected across the output of the output converter.

* * * * *

UNITED STATES PATENT AND TRADEMARK OFFICE
CERTIFICATE OF CORRECTION

PATENT NO. : 5,027,264

DATED : June 25, 1991

INVENTOR(S) : DeDoncker, et al.

It is certified that error appears in the above-identified patent and that said Letters Patent is hereby corrected as shown below:

Column 3, line 29, insert --are graphs -- after "FIG.2".

Column 3, line 32, insert --having -- after "verter".

Column 3, line 33, insert --is a circuit -- after "FIG. 4".

Column 3, line 35, insert --is a -- after "FIG. 5".

Column 3, line 37, insert --a circuit -- after "is".

Column 3, line 39, insert --are graphs -- after "FIG. 7".

Column 3, line 39, delete "f" and replace with --for the circuit --.

Column 3, line 42, "bridge/DC" should be deleted and replaced with --bridge DC/DC--.

Column 3, line 45, "AC/DC" should be deleted and replaced with --DC/DC--.

Column 3, line 46, "a" should be deleted and replaced with --are--.

Column 3, line 47, insert --angle -- after the word "phase".

Column 3, line 49, "a" should be deleted and replaced with --are--.

Column 3, line 53, insert --transformer -- after the first occurrence of the word "phase".

Column 3, line 54, insert --converter -- after "DC/DC".

UNITED STATES PATENT AND TRADEMARK OFFICE
CERTIFICATE OF CORRECTION

PATENT NO. : 5,027,264

DATED : June 25, 1991

INVENTOR(S) : DeDoncker, et al.

It is certified that error appears in the above-identified patent and that said Letters Patent is hereby corrected as shown below:

Column 7, line 40, "L" should be --$L_{p1}$--.

Column 8, line 34, "$0 \leq \emptyset \leq \pi/3$," should be changed to --$0 \leq \emptyset \leq \pi/3$. For $\pi/3 \leq \emptyset \leq 2\pi/3$,--

Column 9, line 1, insert --$d_1 = \frac{2-3\emptyset}{3\pi}$ --.

Column 10, line 2, replace "provided," with --provided--.

Column 10, line 17, part 1.a. of Table 1, insert --($P_0$)-- after "rating".

Column 11, line 39, insert --at -- after "$V_g$"

Signed and Sealed this

Eighth Day of December, 1992

*Attest:*

DOUGLAS B. COMER

*Attesting Officer*   *Acting Commissioner of Patents and Trademarks*

UNITED STATES PATENT AND TRADEMARK OFFICE
CERTIFICATE OF CORRECTION

PATENT NO. : 5,027,264

DATED : June 25, 1991

INVENTOR(S) : Rik W. DeDoncker, et al.

It is certified that error appears in the above-identified patent and that said Letters Patent is hereby corrected as shown below:

Add in the patent in column 1, at line 3 after the title and before the "TECHNICAL FIELD":

This invention was made with United States government support awarded by NASA, Grant # NAG 3-804. The United States Government has certain rights in this invention.

Signed and Sealed this

Nineteenth Day of October, 1993

Attest:

BRUCE LEHMAN

*Attesting Officer*      *Commissioner of Patents and Trademarks*